UNITED STATES PATENT OFFICE.

DAVID H. SMITH, OF MISHAWAKA, INDIANA.

FIRE AND WATER PROOF PAINT.

SPECIFICATION forming part of Letters Patent No. 288,269, dated November 13, 1883.

Application filed May 14, 1883. (No specimens.)

*To all whom it may concern:*

Be it known that I, DAVID H. SMITH, a citizen of the United States, residing at Mishawaka, county of St. Joseph, and State of Indiana, have invented a new and useful composition of matter to be used for the preservation of wood and metal from the action of the weather, water, fire, gases, &c., and especially adapted for the painting of roofs, making them both fire and water proof, the following being the specification thereof.

My composition consists of the following ingredients, combined in the proportions stated, to wit: gas-tar, thirty-two (32) gallons; soluble glass, one (1) gallon; asbestus, two (2) pounds; Winter's metallic brown paint, thirty (30) pounds; alum, eight (8) pounds; borax, two (2) pounds; oxide of zinc, eight (8) pounds; chloride of sodium, eight (8) pounds. The gas-tar, metallic brown paint, and oxide of zinc form the body of my improved paint, while the soluble glass, asbestus, alum, borax, and chloride of sodium impart its hardening qualities and its fire-proof properties. These ingredients are to be thoroughly mixed by stirring or agitating by some suitable means, and the gas-tar heated, as by applying hot it flows more freely.

My improved paint is adapted for any kind of outdoor painting where a good fire-proof paint is required.

Having thus described my invention, I claim and desire to secure by Letters Patent of the United States—

The paint herein described, consisting of gas-tar, soluble glass, asbestus, Winter's metallic brown paint, alum, borax, oxide of zinc, and chloride of sodium in about the proportions specified.

In testimony that I claim the foregoing as my own I have hereunto affixed my signature in the presence of two witnesses.

DAVID H. SMITH. [L. S.]

Witnesses:
WILLIAM H. JUDKINS,
PHILIP CRULL.